(12) United States Patent
Croyle (10) Patent No.: US 10,107,631 B2
(45) Date of Patent: Oct. 23, 2018

(54) METHODS AND SYSTEMS FOR VEHICLE POSITIONING FEEDBACK

(71) Applicant: GM GLOBAL TECHNOLOGY OPERATIONS LLC, Detroit, MI (US)

(72) Inventor: Steven R. Croyle, Bingham Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 49 days.

(21) Appl. No.: 15/241,672

(22) Filed: Aug. 19, 2016

(65) Prior Publication Data

US 2018/0051992 A1     Feb. 22, 2018

(51) Int. Cl.
*G01C 21/28* (2006.01)
*G01C 21/16* (2006.01)
*G01C 21/20* (2006.01)

(52) U.S. Cl.
CPC ............. *G01C 21/28* (2013.01); *G01C 21/16* (2013.01); *G01C 21/20* (2013.01)

(58) Field of Classification Search
CPC ........ G01C 21/32; G01C 21/34; G01C 21/28; G01C 21/20; G01C 21/16; B08G 21/34
See application file for complete search history.

(56) References Cited

U.S. PATENT DOCUMENTS

| | | | | |
|---|---|---|---|---|
| 5,955,973 | A * | 9/1999 | Anderson | G01C 21/00 111/130 |
| 2007/0124072 | A1 * | 5/2007 | Nakayama | G01C 21/3658 701/431 |
| 2014/0330479 | A1 * | 11/2014 | Dolgov | B60W 30/16 701/28 |
| 2017/0337849 | A1 * | 11/2017 | Matsumoto | G01C 21/26 |

\* cited by examiner

*Primary Examiner* — Yonel Beaulieu
*Assistant Examiner* — Martin A Weeks (57) ABSTRACT

Methods and systems are provided for calculating a position of a vehicle on a road segment and updating a calibration of a heading sensor based on a lane change status of the vehicle. In one embodiment, a method includes receiving vehicle characteristic data from at least one vehicle sensor; receiving map data corresponding to a vehicle location; determining a lane change status of the vehicle; calculating the vehicle position using the map data if the vehicle has not executed a lane change maneuver and calculating the vehicle position using the vehicle characteristic data if the vehicle has executed a lane change maneuver, and calibrating a heading sensor based on one or more of the map data and the vehicle characteristic data.

18 Claims, 3 Drawing Sheets

METHODS AND SYSTEMS FOR VEHICLE POSITIONING FEEDBACK

The present invention relates generally to the field of vehicles and, more specifically, to methods and systems for providing vehicle positioning feedback with respect to a lane position status of the vehicle.

Current vehicle navigation techniques use dead reckoning methods with navigational corrections made using Global Navigation Satellite System (GNSS) and/or map matching. Dead reckoning is the process of calculating a vehicle's current position using a previously determined position and advancing that position based upon known or estimated speeds over an elapsed time and course. However, dead reckoning sensor types—accelerometers, gyros, wheel counters, etc.—need to be calibrated so that the sensors can be used in the computation of the position of the vehicle. This calibration is currently performed from GNSS data, when available, and map matching. GNSS can become unavailable based on the physical environment of the vehicle, such as when a vehicle passes through dense vegetation or through a tunnel.

Some methods of location computation for land based vehicles use map matching as one method of correcting a vehicle location or heading determined using dead reckoning. Map matching is the process of matching a sequence of real world coordinates into a digital map. If a vehicle is following a path that is the same as a road in a digitized road network, the map matching algorithm can "snap" the position of the vehicle to the digitized road and set the heading as the heading of the road segment. The setting of the map matched heading can also be used to help calibrate dead reckoning sensors so that when the sensors are needed, that is, during loss or absence of a GNSS signal, the sensors will be able to be used. However, map matching can become incorrect in situations when the vehicle has changed lanes (a heading change) but the map matching process detects that the vehicle is on the road segment without sensing the lane change and thus erroneously fixes the heading of the vehicle to match the road segment. This mismatch of the vehicle heading to the road segment also affects the calibration of the heading sensors as the system will calibrate the sensors assuming that no vehicle heading change has occurred when a heading change has actually occurred. Using map matching as a navigational correction during a lane change maneuver may cause errors in the calibration of the heading sensors because lane changing may be seen as drift from the heading determined by the mapped road segment.

SUMMARY

Accordingly, it is desired to provide an improved method for monitoring a vehicle's position and communicate information regarding the status of the vehicle with respect to the lane boundaries. When this information is coupled with an advanced or automated driver system (ADS) or an Advanced Driver Assistance System (ADAS) and maps containing lane level information, the position computation of the vehicle can accurately map the heading of the vehicle to the lane of travel. Additionally, it is desired to provide an improved method that can also accurately inform the position computation and sensor calibration that the vehicle has not maintained its lane and that map matching should not be used to update the position information or to calibrate the dead reckoning sensors. Furthermore, an improved method for vehicle position monitoring can be used to remove ambiguity when a vehicle has moved from a lane of travel to an exit lane or an exit. Other desirable features and characteristics of the present invention will be apparent from the following description and claims, considered in conjunction with the accompanying drawings.

Embodiments according to the present disclosure provide a number of advantages. For example, embodiments according to the present disclosure enable more accurate determination of a vehicle position on a roadway having multiple lanes or multiple entrances and exits. Embodiments according to the present invention also enable more accurate sensor calibration used to more accurately determine vehicle position.

In one aspect, a method of calculating a position of a vehicle on a road segment is disclosed. The method includes the steps of providing the vehicle with at least one vehicle sensor and a controller in electronic communication with the at least one vehicle sensor; receiving, by the controller, vehicle characteristic data corresponding to at least one vehicle characteristic from the at least one vehicle sensor; receiving, by the controller, map data corresponding to a vehicle location; determining, by the controller, a lane change status indicating whether the vehicle has executed a lane change maneuver within a calibratable time interval; calculating, by the controller, the vehicle position using the map data in response to the vehicle not having executed a lane change maneuver within the calibratable time interval; and calculating, by the controller, the vehicle position using the vehicle characteristic data in response to the vehicle having executed a lane change maneuver within the calibratable time interval.

In some aspects, the at least one vehicle sensor includes a vehicle heading sensor and one or more of an accelerometer, a vehicle speed sensor, and an optical sensor. In some aspects, the map data includes lane information of a mapped road segment. In some aspects, the vehicle characteristic data is indicative of one of crossing a lane boundary of a road lane and maintaining a vehicle trajectory within the road lane. In some aspects, the vehicle not having executed the lane change maneuver includes the vehicle maintaining the vehicle trajectory within the road lane. In some aspects, the vehicle executing the lane change maneuver includes the vehicle crossing the lane boundary of the road lane.

In some aspects, the method further includes calibrating the heading sensor using the map data in response to the lane change status indicating the vehicle has not executed a lane change maneuver within the calibratable time interval and calibrating the heading sensor using the vehicle characteristic data in response to the lane change status indicating the vehicle has executed a lane change maneuver within the calibratable time interval.

In another aspect, an automotive vehicle includes a vehicle body and a plurality of wheels coupled to the vehicle body; at least one vehicle sensor configured to detect at least one vehicle characteristic; and a controller in communication with the at least one vehicle sensor, the controller configured to receive vehicle characteristic data corresponding to the at least one vehicle characteristic from the at least one vehicle sensor; receive map data corresponding to a location of the vehicle; determine a lane change status indicating whether the vehicle has executed a lane change maneuver within a calibratable time interval; calculate the vehicle position using the map data in response to the vehicle not having executed a lane change maneuver within the calibratable time interval; and calculate the vehicle position using the vehicle characteristic data in response to the vehicle having executed a lane change maneuver within the calibratable time interval.

In some aspects, the at least one vehicle sensor includes a vehicle heading sensor and one or more of an accelerometer, a vehicle speed sensor, and an optical sensor. In some aspects, the map data includes lane information of a mapped road segment. In some aspects, the vehicle characteristic data is indicative of one of crossing a lane boundary of a road lane and maintaining a vehicle trajectory within the road lane.

In some aspects, calculating the vehicle position using the map data includes matching the vehicle position to the map data and calibrating the vehicle heading sensor using the map data in response to the lane change status indicating the vehicle has not executed the lane change maneuver within the calibratable time interval. In some aspects, calculating the vehicle position using the vehicle characteristic data includes updating the vehicle position and calibrating the vehicle heading sensor using the vehicle characteristic data in response to the lane change status indicating the vehicle has executed the lane change maneuver within the calibratable time interval.

In yet another aspect, a system for calculating a position of a vehicle on a road segment includes at least one vehicle sensor configured to detect a vehicle characteristic; and a controller in communication with the at least one sensor, the controller configured to receive map data corresponding to a vehicle location, determine a lane change status indicating whether the vehicle has executed a lane change maneuver within a calibratable time interval, and, calculating the vehicle position using the vehicle characteristic data in response to the lane change status indicating the vehicle having executed a lane change maneuver within the calibratable time interval, and otherwise calculating the vehicle position using the map data in response to the vehicle not having executed a lane change maneuver within the calibratable time interval.

In some aspects, the at least one vehicle sensor includes a vehicle heading sensor and one or more of an accelerometer, a vehicle speed sensor, and an optical sensor. In some aspects, the map data includes lane information of a mapped road segment. In some aspects, the vehicle characteristic data is indicative of one of crossing a lane boundary of a road lane and maintaining a vehicle trajectory within the road lane.

In some aspects, calculating the vehicle position using the map data includes matching the vehicle position to the map data. In some aspects, calculating the vehicle position using the vehicle characteristic data includes updating the vehicle position using the vehicle characteristic data.

In some aspects, the controller is further configured to calibrate the vehicle heading sensor using the map data in response to the lane change status indicating the vehicle has not executed the lane change maneuver within the calibratable time interval and calibrate the vehicle heading sensor using the vehicle characteristic data in response to the lane change status indicating the vehicle has executed the lane change maneuver within the calibratable time interval.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
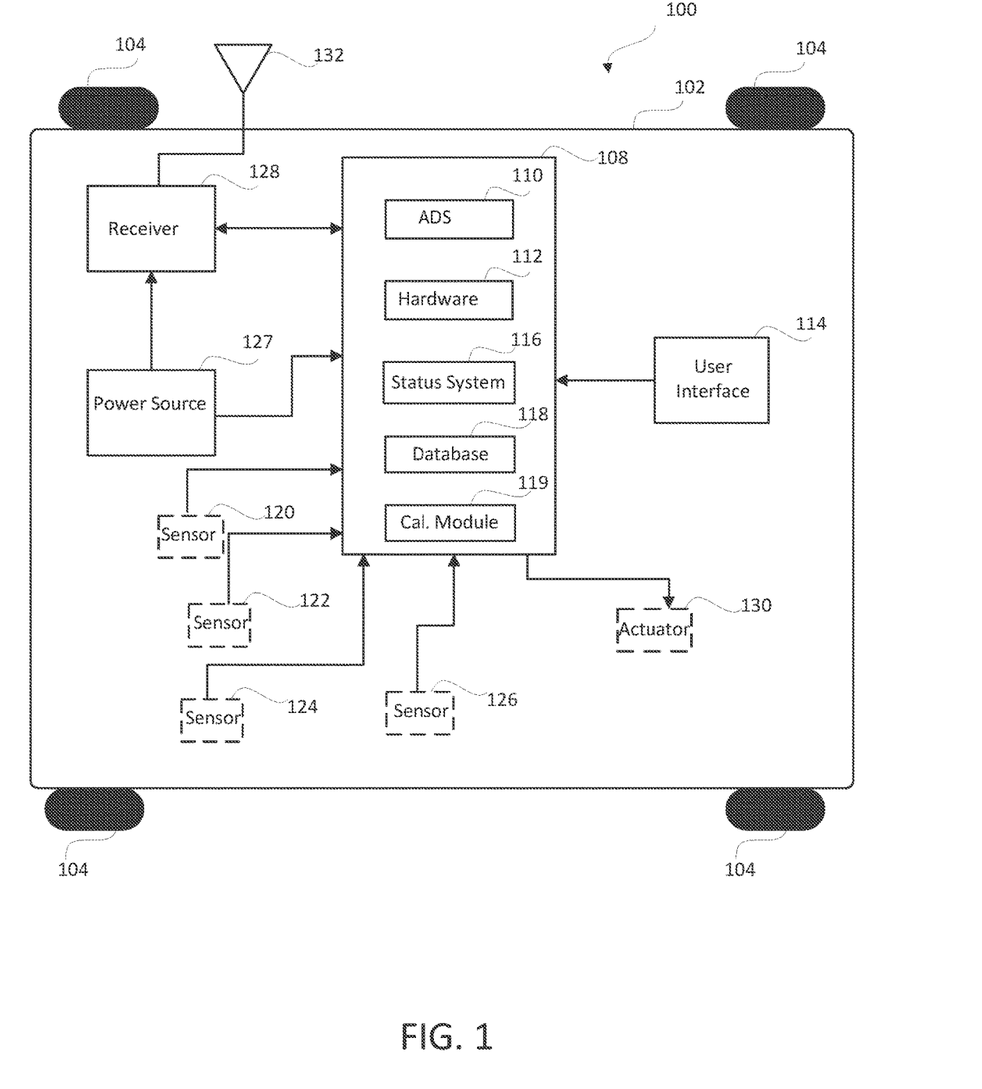
FIG. 1 is a functional block diagram of a vehicle that includes, among other features, a system for monitoring a vehicle's position, according to an embodiment.

With reference to FIG. 1, an automotive vehicle 100 according to the present disclosure is shown in schematic form. The automotive vehicle 100 includes a controller, a plurality of sensors, a plurality of control modules, and a plurality of actuators configured to perform various vehicle control tasks, including, but not limited to, monitoring a vehicle's position, such as the position of the vehicle 100 between a set of lane markers or boundaries, updating vehicle position data based on whether a lane change maneuver has been detected within a calibratable time interval, and updating sensor calibration based on a lane change status of the vehicle. Although the figures shown herein depict an example with certain arrangements of elements, additional elements, devices, features, or components may be present in other embodiments. It should also be understood that FIG. 1 is merely illustrative and may not be drawn to scale. Throughout this disclosure, a "vehicle location" or "location" refers to the longitude, latitude, and altitude/elevation location of the vehicle and a "vehicle position" or "position" refers to the position of the vehicle on a road segment, for example, the position of the vehicle in a left, right, center, or other lane of a road segment or the position of the vehicle on an entry or exit ramp.

The vehicle 100 may be any one of a number of different types of automobiles, such as, for example, a sedan, a wagon, a truck, or a sport utility vehicle (SUV). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

As shown in FIG. 1, the vehicle 100 generally includes a body 102, wheels 104, and a controller 108. The body 102 is arranged on a chassis (not shown) and substantially encloses the other components of the vehicle 100. The body 102 and the chassis may jointly form a frame. The wheels 104 are each rotationally coupled to the chassis near a respective corner of the body 102.

With further reference to FIG. 1, the vehicle 100 also includes a plurality of sensors 120, 122, 124, 126. In the illustrated embodiment, sensor 122 is an accelerometer, sensor 124 is a speed sensor, and sensor 126 is a heading sensor. Sensor 120 represents other sensors that sense observable conditions of the vehicle or the environment surrounding the vehicle and may include RADAR, LIDAR, optical cameras, thermal cameras, ultrasonic sensors, and/or additional sensors as appropriate. In some embodiments, the vehicle 100 also includes a plurality of actuators 130 configured to receive control commands to control steering, shifting, throttle, braking, or other aspects of the vehicle 100, as discussed in greater detail below.

The vehicle 100 includes at least one controller 108. While depicted as a single unit for illustrative purposes, the controller 108 may additionally include one or more other controllers, collectively referred to as a "controller." The controller 108 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 108 in controlling the vehicle.

The controller 108 includes an advanced or automated driving system (ADS) 110 for monitoring vehicle position and automatically controlling various actuators in the vehicle. In an exemplary embodiment, the ADS 110 is configured to control a propulsion system, transmission, steering system, and wheel brakes of the vehicle 100 to control vehicle acceleration, steering, and braking, respectively, without human intervention via a plurality of actuators 130 in response to inputs from a plurality of sensors 120, 122, 124, 126. While the vehicle 100 is shown in FIG. 1 with the ADS 110 to facilitate autonomous or semi-autonomous operation, the systems and methods to update the heading sensor calibration and calculate the vehicle position based on lane change status described herein may be used as part of a general vehicle navigation system.

With continued reference to FIG. 1, the controller 108 also includes interfacing hardware 112. The interfacing hardware 112 may include items such as a Controller Area Network (CAN) bus interface, analog to digital converters, and other hardware drivers used to enable communication between the controller 108 and other components of the vehicle 100, for example, the sensors 120, 122, 124, 126 and the actuators 130. The ADS 110 receives inputs from the sensors 120, 122, 124, 126 to determine the vehicle position and uses this information to more accurately perform the position computation of the vehicle, as discussed in greater detail below. In some embodiments, the controller 108 also includes a lane change status module 116 that uses information gathered from sensors, such as sensors 120, 122, 124, 126 to determine whether the vehicle 100 has executed a lane change maneuver within a calibratable time interval. A mapping database 118 that may be stored in a non-transient computer readable storage medium of the controller 108 provides map and location data used in determining when the vehicle has maintained its current lane and additional information used in the position computation of the vehicle 100. In some embodiments, the map data stored by the mapping database includes lane information of the mapped road segments. The lane information includes the number of lanes and the position of lane boundaries of the mapped road segments. The mapping database 118 may also receive information from the ADS 110 to update mapping and location information stored in the mapping database 118. The controller 108 also includes, in some embodiments, a sensor calibration module 119. The sensor calibration module 119 receives input from the plurality of sensors 120, 122, 124, 126 and calibrates the heading sensor 126 using map matching algorithms or optical sensor data indicating a vehicle position on the roadway depending on the lane change status identified by the lane change status system 116. The ADS 110 may receive output 121 from the sensor calibration module 119 as shown in FIG. 2.

A Global Navigation Satellite System (GNSS) includes an antenna 132 electrically connected to a GNSS receiver 128. The GNSS provides location information (longitude, latitude, and altitude/elevation) to the ADS 110. When GNSS information is available, the heading sensor 126 can be calibrated using the heading information contained as part of the navigation information from the GNSS. However, as discussed in greater detail below, navigation information may not be available, for example, when a vehicle travels through a tunnel or through heavy vegetation that obscures satellite reception. In these scenarios, map matching can be used to calibrate the heading sensor 126; however, map matching may not always provide the most accurate heading information, particularly if a vehicle has changed position on a road way, such as changing lanes or entering or exiting a highway. When GNSS information is not available, the vehicle's lane change status can be used to determine whether map matching should be used to perform heading sensor calibration calculations.

In some embodiments, the user provides input to the ADS 110 via a user interface 114 which, in some embodiments, may include a steering wheel, turn signal, or other user input to indicate an intended or executed change in vehicle heading, such as a lane change maneuver. A power source 127 provides electrical power to electric components of the vehicle 100, including, for example and without limitation, the GNSS receiver 128 and the controller 108.

Figure 2:
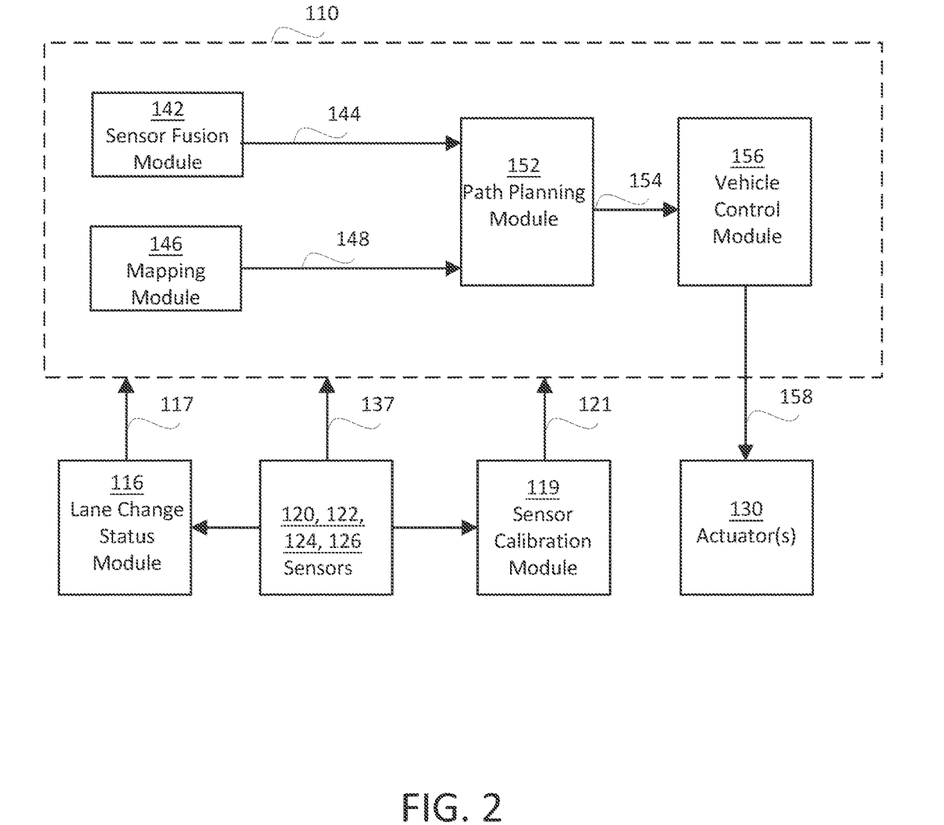
FIG. 2 is a schematic block diagram of an advanced or automated driving system (ADS) for a vehicle, according to an embodiment.

As shown in FIG. 2, the ADS 110 includes multiple distinct control systems for determining the presence, location, classification, and path of detected features or objects in the vicinity of the vehicle, including monitoring a vehicle position on a road segment. The ADS 110 is configured to receive inputs from a variety of sensors, such as the sensors 120, 122, 124, 126 illustrated in FIG. 1, and synthesize and process the sensor inputs to generate parameters used as inputs for other control algorithms of the ADS 110.

The ADS 110 includes a sensor fusion module 142 for determining the presence, location, and path of detected features in the vicinity of the vehicle. The sensor fusion module 142 is configured to receive inputs 137 from a variety of sensors, such as the sensors 120, 122, 124, 126 illustrated in FIG. 1. The sensor fusion module 142 processes and synthesizes the inputs from the variety of sensors and generates a sensor fusion output 144. The sensor fusion output 144 includes various calculated parameters including, but not limited to, a location of a detected obstacle relative to the vehicle, a predicted path of the detected obstacle relative to the vehicle, and a location and orientation of traffic lanes relative to the vehicle.

The ADS 110 also includes a mapping and localization module 146 for determining the location of the vehicle and route for a current drive cycle. The mapping and localization module 146 is also configured to receive inputs from a variety of sensors, such as the sensors 120, 122, 124, 126 illustrated in FIG. 1. The mapping and localization module 146 processes and synthesizes the inputs from the variety of sensors, and generates a mapping and localization output 148. The mapping and localization output 148 includes various calculated parameters including, but not limited to, a vehicle route for the current drive cycle, and a current vehicle location relative to the route.

Figure 3:
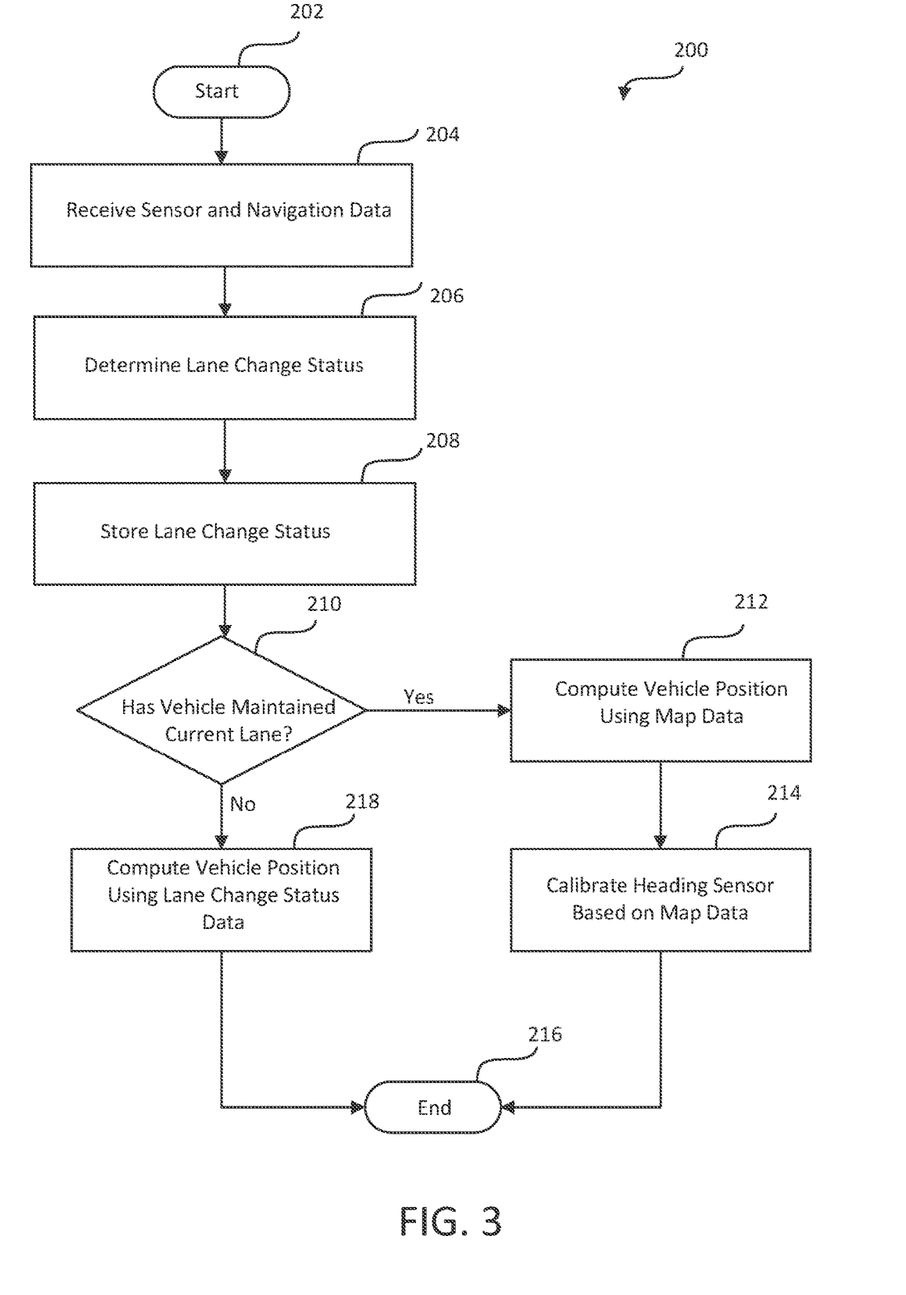
FIG. 3 is a flowchart of a process for monitoring a vehicle's position and using the vehicle position information to improve sensor calibration that can be implemented in connection with the system of FIG. 1, according to an embodiment.

The mapping and localization module 146 is also configured to receive input from the lane change status module 116. The lane change status module 116 monitors the position of the vehicle relative to road lane markers or boundaries. Using data from the variety of sensors 120, 122, 124, 126, the lane change status module 116 can determine a lane change status of the vehicle and generates output 117 that indicates the lane change status of the vehicle 100. The lane change status indicates whether the vehicle 100 has changed lanes or crossed a lane boundary, maintained a trajectory within a current lane, or if the lane change status is ambiguous or cannot be determined. In some embodiments, such as when the vehicle enters a road with multiple lanes, the lane change status module 116 can also "count" the number of lane boundaries crossed by the vehicle to determine the vehicle's lane of travel. Additionally, the lane change status module 116 can also distinguish a vehicle crossing a lane boundary during an intentional lane change versus vehicle drift over the lane boundary by, for example and without limitation, monitoring the time between lane boundary crossings and/or monitoring left lane boundary crossings and right lane boundary crossing. The lane change status is one calculated parameter used by the mapping and localization module 146 to determine the vehicle position on the road segment. Additionally, the lane change status is used to supplement the sensor data provided by the variety of sensors 120, 122, 124, 126 to more accurately determine the vehicle position and reduce vehicle position drift. If the lane change status module 116 determines that the vehicle 100 has changed lanes, the mapping and localization module 146 will not use a map matching process to "snap" a vehicle to a road segment since, in this scenario, map matching processes can result in errors in the position calculation. Furthermore, use of map matching to determine vehicle position may result in calibration errors in the vehicle heading sensors because the lane change maneuver is viewed by the system as drift from the heading of the mapped road segment. FIG. 3, discussed below, illustrates a method incorporating the lane change status to more accurately determine a vehicle position and improve the calibration of the heading sensors.

The ADS 110 additionally includes a path planning module 152 for determining a vehicle path to be followed to maintain the vehicle on the desired route while obeying traffic laws and avoiding any detected obstacles. The path planning module 152 employs, for example, and without limitation, an obstacle avoidance algorithm configured to avoid any detected obstacles in the vicinity of the vehicle, a lane keeping algorithm configured to maintain the vehicle in a current traffic lane, and a route keeping algorithm configured to maintain the vehicle on the desired route. The path planning module 152 is configured to receive the sensor fusion output 144 and the mapping and localization output 148. The path planning module 152 processes and synthesizes the sensor fusion output 144 and the mapping and localization output 148, and generates a path planning output 154. The path planning output 154 includes a commanded vehicle path based on the vehicle route, vehicle location relative to the route, location and orientation of traffic lanes, and the presence and path of any detected obstacles.

The ADS 110 further includes a vehicle control module 156 for issuing control commands to vehicle actuators. The vehicle control module employs a first path algorithm for calculating a vehicle path resulting from a given set of actuator settings. The vehicle control module 156 is configured to receive the path planning output 154. The vehicle control module 156 processes the path planning output 154 and generates a vehicle control output 158. The vehicle control output 158 includes a set of actuator commands to achieve the commanded path from the vehicle control module 156, including but not limited to a steering command, a shift command, a throttle command, and a brake command.

The vehicle control output 158 is communicated to actuators 130. The actuators 130 receive controls signals from the controller 108 to control steering, braking, throttle, or other aspects of the vehicle 100. In an exemplary embodiment, the actuators 130 include a steering control, a shifter control, a throttle control, and a brake control. The steering control may, for example, control a steering system of the vehicle 100. The shifter control may, for example, control a transmission of the vehicle 100. The throttle control may, for example, control a propulsion system of the vehicle 100. The brake control may, for example, control wheel brakes of the wheels 104 of the vehicle 100.

While the vehicle 100 as shown in FIG. 1 includes the ADS 110, the vehicle 100 may not include the ADS 110 but instead include a navigation system that receives the input 117 from the lane change status module 116 to perform the vehicle position calculation discussed above. Additionally, the sensor calibration module 119 may also provide the input 121 to the vehicle navigation system to calibrate the heading sensor 126 depending on the lane change status.

FIG. 3 illustrates a method 200 that incorporates lane change status information as feedback and additional information used in vehicle positioning calculations in order to improve vehicle position accuracy and heading sensor calibration. The method 200 can be utilized in connection with the vehicle 100, the controller 108, and the various modules of the ADS 110, in accordance with exemplary embodiments. The order of operation within the method 200 is not limited to the sequential execution illustrated in FIG. 3, but may be performed in one or more varying orders as applicable and in accordance with the present disclosure.

As shown in FIG. 3, starting at 202, the method proceeds to step 204. At step 204, the controller 108 receives sensor data from a plurality of vehicle sensors such as the sensors 120, 122, 124, 126 and also receives navigation data indicating the vehicle location from a navigational data receiver such as the GNSS receiver 128, if available. Additionally, at step 204, the controller 108 accesses map data from the map information database 118. In some embodiments, the map data may also include the mapping and localization output 148 determined as a result of the calculations performed by the mapping and localization module 146 of the ADS 110. The controller 108 processes the sensor data, GNSS data, and map data at step 206 to determine the lane change status. The lane change status indicates whether the vehicle 100 has changed lanes, has maintained travel within a lane, or that the lane change status is unknown or ambiguous. Detection of a lane change and determination of the lane change status may be performed by, for example and without limitation, the lane change status module 116 using data from the plurality of sensors 120, 122, 124, 126. The lane change status is stored within a non-transient computer readable storage medium at 208 and evaluated at 210.

If, at decision point 210, the lane change status indicates that the vehicle has maintained the current lane, the method 200 proceeds to step 212 and the controller 108 via, for example, the mapping and localization module 146, computes the vehicle position using heading information obtained from current map data. In this scenario, the current map data provides information that is accurate to determine the vehicle position and heading because the vehicle has not made a heading change from the road heading, such as a lane change or highway entrance or exit that may cause an inaccurate determination of the vehicle's position on the road segment.

The method 200 proceeds to step 214 and the controller 108 calibrates the heading sensor based on the map data. Heading sensors, such as the heading sensor 126, are used, in the absence of GNSS data, to compute the vehicle heading. A dead reckoning sensor receives heading information from the GNSS, if available, or from map matching to map data. In the absence of GNSS data and if the vehicle has not executed a lane change maneuver within a calibratable time interval, map matching provides an accurate input to the heading sensor calibration computation. At 214, since a lane change has not occurred, the map data is the most accurate indicator of the vehicle heading. Therefore, the vehicle heading computed from the vehicle heading sensor can be compared or matched against the heading provided by the map data and calibration parameters can be computed for the heading sensor to more accurately calibrate the vehicle heading sensor 126. The method 200 then proceeds to 216 and ends.

However, if at step 210 the lane change status indicates that the vehicle has executed a lane change maneuver within a calibratable time interval, or the lane change status is unknown or ambiguous, the method 200 proceeds to step 218, and the controller computes the vehicle position using the information provided by the lane change status module 116 and one or more of the plurality of sensors 120, 122, 124, 126. Since the vehicle heading has diverted from the road heading, such as when a lane change has occurred, or if the lane change status module 116 determines that the lane change status of the vehicle is ambiguous, the navigation data, if available, and the vehicle sensor data, rather than the map data, are more accurate indicators of the vehicle heading. When GNSS data is not available and map matching is not applicable due to a lane change maneuver, the heading sensor 126 can be calibrated using the most recent calibration settings. Using the most recent settings avoids unnecessary and possibly inaccurate calibration of the heading sensor 126, as the lane change is seen as drift from the heading of the mapped road segment. Thereafter, the method 200 ends at 216.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of calculating a position of a vehicle on a road segment, the method comprising:
   providing the vehicle with at least one vehicle sensor and a controller in electronic communication with the at least one vehicle sensor, wherein the at least one vehicle sensor comprises a vehicle heading sensor;
   receiving, by the controller, vehicle characteristic data corresponding to at least one vehicle characteristic from the at least one vehicle sensor;
   receiving, by the controller, map data corresponding to a vehicle location;
   determining, by the controller, a lane change status indicating whether the vehicle has executed a lane change maneuver within a calibratable time interval;
   calculating, by the controller, the vehicle position using the map data in response to the vehicle not having executed a lane change maneuver within the calibratable time interval;
   calculating, by the controller, the vehicle position using the vehicle characteristic data in response to the vehicle having executed a lane change maneuver within the calibratable time interval;
   calibrating, by the controller, the vehicle heading sensor using the map data in response to the lane change status indicating the vehicle has not executed a lane change maneuver within the calibratable time interval; and
   calibrating, by the controller, the vehicle heading sensor using the vehicle characteristic data in response to the lane change status indicating the vehicle has executed a lane change maneuver within the calibratable time interval.

2. The method of claim 1, wherein the at least one vehicle sensor includes one or more of an accelerometer, a vehicle speed sensor, and an optical sensor.

3. The method of claim 2, wherein the map data includes lane information of a mapped road segment.

4. The method of claim 3, wherein the vehicle characteristic data is indicative of one of crossing a lane boundary of a road lane and maintaining a vehicle trajectory within the road lane.

5. The method of claim 4, wherein the vehicle not having executed the lane change maneuver comprises the vehicle maintaining the vehicle trajectory within the road lane.

6. The method of claim 4, wherein the vehicle executing the lane change maneuver comprises the vehicle crossing the lane boundary of the road lane.

7. An automotive vehicle, comprising:
   a vehicle body and a plurality of wheels coupled to the vehicle body;
   at least one vehicle sensor configured to detect at least one vehicle characteristic, wherein the at least one vehicle sensor comprises a vehicle heading sensor; and
   a controller in communication with the at least one vehicle sensor, the controller configured to
     receive vehicle characteristic data corresponding to the at least one vehicle characteristic from the at least one vehicle sensor;
     receive map data corresponding to a location of the vehicle;
     determine a lane change status indicating whether the vehicle has executed a lane change maneuver within a calibratable time interval;
     calculate the vehicle position using the map data in response to the vehicle not having executed a lane change maneuver within the calibratable time interval;
     calculate the vehicle position using the vehicle characteristic data in response to the vehicle having executed a lane change maneuver within the calibratable time interval;
     calibrate the vehicle heading sensor using the map data in response to the lane change status indicating the vehicle has not executed a lane change maneuver within the calibratable time interval; and
     calibrate the vehicle heading sensor using the vehicle characteristic data in response to the lane change status indicating the vehicle has executed a lane change maneuver within the calibratable time interval.

8. The automotive vehicle of claim 7, wherein the at least one vehicle sensor includes one or more of an accelerometer, a vehicle speed sensor, and an optical sensor.

9. The automotive vehicle of claim 8, wherein the map data includes lane information of a mapped road segment.

10. The automotive vehicle of claim 9, wherein the vehicle characteristic data is indicative of one of crossing a lane boundary of a road lane and maintaining a vehicle trajectory within the road lane.

11. The automotive vehicle of claim 9, wherein calculating the vehicle position using the map data comprises matching the vehicle position to the map data.

12. The automotive vehicle of claim 8, wherein calculating the vehicle position using the vehicle characteristic data comprises updating the vehicle position.

13. A system for calculating a position of a vehicle on a road segment, comprising:
at least one vehicle sensor configured to detect a vehicle characteristic, the at least one vehicle sensor comprising a vehicle heading sensor; and
a controller in communication with the at least one sensor, the controller configured to receive map data corresponding to a location of a vehicle, receive vehicle characteristic data corresponding to the at least one vehicle characteristic from the at least one vehicle sensor, determine a lane change status indicating whether the vehicle has executed a lane change maneuver within a calibratable time interval, calculate the vehicle position and calibrate the vehicle heading sensor using the vehicle characteristic data in response to the vehicle having executed a lane change maneuver within the calibratable time interval, and otherwise calculate the vehicle position and calibrate the vehicle heading sensor using the map data in response to the vehicle not having executed a lane change maneuver within the calibratable time interval.

14. The system of claim 13, wherein the at least one vehicle sensor includes one or more of an accelerometer, a vehicle speed sensor, and an optical sensor.

15. The system of claim 14, wherein the map data includes lane information of a mapped road segment.

16. The system of claim 15, wherein the vehicle characteristic data is indicative of one of crossing a lane boundary of a road lane and maintaining a vehicle trajectory within the road lane.

17. The system of claim 16, wherein calculating the vehicle position using the map data comprises matching the vehicle position to the map data.

18. The system of claim 16, wherein calculating the vehicle position using the vehicle characteristic data comprises updating the vehicle position using the vehicle characteristic data.

* * * * *